(12) United States Patent
Wang et al.

(10) Patent No.: US 11,189,198 B2
(45) Date of Patent: Nov. 30, 2021

(54) FLEXIBLE DISPLAY COVER PLATE, PREPARATION METHOD THEREOF, AND FOLDABLE DISPLAY APPARATUS

(71) Applicant: BOE Technology Group Co., Ltd., Beijing (CN)

(72) Inventors: Haoran Wang, Beijing (CN); Paoming Tsai, Beijing (CN)

(73) Assignee: BOE Technology Group Co, Ltd., Beijing (CN)

( * ) Notice: Subject to any disclaimer, the term of this patent is extended or adjusted under 35 U.S.C. 154(b) by 0 days.

(21) Appl. No.: 16/916,143

(22) Filed: Jun. 30, 2020

(65) Prior Publication Data

US 2021/0065589 A1 Mar. 4, 2021

(30) Foreign Application Priority Data

Aug. 29, 2019 (CN) .......................... 201910810573.3

(51) Int. Cl.
*G09F 9/30* (2006.01)
*G06F 1/16* (2006.01)

(52) U.S. Cl.
CPC ............ *G09F 9/301* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 10,509,440 B2 * | 12/2019 | Hussa | ..................... B32B 37/14 |
| 2017/0060188 A1 * | 3/2017 | Han | ..................... G06F 1/1681 |
| 2020/0146165 A1 | 5/2020 | Zuo | |
| 2020/0272204 A1 * | 8/2020 | Su | .......................... G09F 9/301 |
| 2021/0011514 A1 * | 1/2021 | Wang | ..................... G06F 1/1616 |

FOREIGN PATENT DOCUMENTS

| | | |
|---|---|---|
| CN | 207818084 U | 9/2018 |
| CN | 108831305 A | 11/2018 |
| CN | 108832019 A | 11/2018 |
| CN | 109345958 A | 2/2019 |
| KR | 10-2014-0095206 A | 8/2014 |

OTHER PUBLICATIONS

Office Action dated Dec. 23, 2020 for Chinese Patent Application No. 201910810573.3 and English Translation.

* cited by examiner

*Primary Examiner* — Lisa Lea-Edmonds
(74) *Attorney, Agent, or Firm* — Ling Wu; Stephen Yang; Ling and Yang Intellectual Property

(57) ABSTRACT

A flexible display cover plate, a preparation method thereof and a foldable display apparatus are provided. The flexible display cover plate includes a flexible substrate, wherein the flexible substrate includes a plurality of non-bendable portions and at least one bendable portion, the bendable portion is connected between adjacent non-bendable portions, a resilient functional layer for resilience of the bendable portion is arranged on the flexible substrate, and the resilient functional layer covers at least part of the bendable portion.

20 Claims, 4 Drawing Sheets

FLEXIBLE DISPLAY COVER PLATE, PREPARATION METHOD THEREOF, AND FOLDABLE DISPLAY APPARATUS

CROSS-REFERENCE TO RELATED APPLICATION

The present application claims the priority to Chinese patent application No. 201910810573.3, filed to the CNIPA on Aug. 29, 2019, the content of which is hereby incorporated by reference.

TECHNICAL FIELD

The present disclosure relates to, but is not limited to, the technical field of display, in particular, a flexible display cover plate, a preparation method thereof, and a foldable display apparatus.

BACKGROUND

Since a concept of a foldable mobile terminal is widely spread, the foldable mobile terminal has been a focus of terminal manufacturers. A flexible Organic Light-Emitting Diode (OLED) display module, as a main body of a foldable display, also becomes a new favorite in the market and is highly valued and invested by various related manufacturers. An Organic Light-Emitting Diode (OLED) flexible panel has become a technically feasible solution, and current development focuses on design and integration of a fold module matching a whole machine.

Materials in a fold display module have characteristic of flexibility. At present, selection of materials is concentrated on various types of flexible polymer materials. Due to the characteristics of the polymer materials, they are easy to soften and permanently deform under long-term stress, especially in a high-temperature environment, which eventually leads to the fold display module unable to return to flat after being reliably bent, produces irreversible deformation, and even leads to a functional fracture and failure of the display panel.

SUMMARY

The following is a summary of the subject matter of the present disclosure described in detail. The summary is not intended to limit a scope of protection of the claims.

A flexible display cover plate includes a flexible substrate. The flexible substrate includes a plurality of non-bendable portions and at least one bendable portion, and the bendable portion is connected between adjacent non-bendable portions. A resilient functional layer for resilience of the bendable portion is arranged on the flexible substrate and the resilient functional layer covers at least part of the bendable portion.

In an exemplary embodiment, the resilient functional layer includes at least one resilient metal layer, the bendable portion includes a display area and a non-display area, and the resilient metal layer is located on the non-display area.

In an exemplary embodiment, the display area is located at the middle of the flexible substrate, and the non-display area is located at edges of the flexible substrate and surrounds a periphery of the display area.

In an exemplary embodiment, all or part of the resilient metal layer is provided with openings.

In an exemplary embodiment, the resilient functional layer further includes a resilient filling layer, the resilient metal layer is formed on the flexible substrate, and the resilient filling layer is superposed on the resilient metal layer and covers the flexible substrate.

In an exemplary embodiment, the resilient functional layer includes a plurality of resilient metal layers arranged in superposition, and adjacent resilient metal layers are separated by the resilient filling layer.

In an exemplary embodiment, the resilient functional layer further includes a resilient filling layer, the resilient filling layer is superposed on the flexible substrate and covers the flexible substrate, and the resilient metal layer is superposed on the resilient filling layer.

In an exemplary embodiment, a material of the resilient filling layer is a transparent material.

In an exemplary embodiment, a material of the resilient filling layer is transparent silicon gel or a transparent optical bonding material.

In an exemplary embodiment, a material of the resilient filling layer is a transparent material.

In an exemplary embodiment, a material of the resilient filling layer is transparent silicon gel or a transparent optical bonding material.

In an exemplary embodiment, the resilient metal layer is of a strip shape, and the resilient metal layer penetrates through the bendable portion of the flexible substrate along a length direction of the flexible substrate.

In an exemplary embodiment, a bonding layer is provided between the resilient functional layer and the flexible substrate.

In an exemplary embodiment, a material of the bonding layer is Optically Clear Adhesive or Optically Transparent Resin.

In an exemplary embodiment, a material of the flexible substrate is transparent polyimide or transparent silicon gel.

In an exemplary embodiment, the bendable portion extends across the flexible substrate along a width direction of the flexible substrate.

In an exemplary embodiment, the flexible display cover plate is adapted to be attached to a display panel.

In an exemplary embodiment, the display panel corresponds to a display area of the flexible display cover plate, and a size of the display panel is the same as that of the display area of the flexible display cover plate.

The present disclosure further provides a foldable display apparatus including the flexible display cover plate of any one of the foregoing.

The present disclosure further provides a method for preparing a flexible display cover plate. The preparation method includes: forming a flexible substrate with a plurality of non-bendable portions and at least one bendable portion, the bendable portion being connected between adjacent non-bendable portions; forming a resilient functional layer for resilience of the bendable portion on the flexible substrate, the resilient functional layer covering at least part of the bendable portion.

Other aspects will become apparent upon reading and understanding accompanying drawings and detailed descriptions.

BRIEF DESCRIPTION OF DRAWINGS

Accompanying drawings are used to provide further understanding of technical solutions of the present disclosure, form a part of the specification, explain the technical solutions of the present disclosure together with embodiments of the present disclosure, and do not constitute a limitation on the technical solutions of the present disclo

Figure 1:
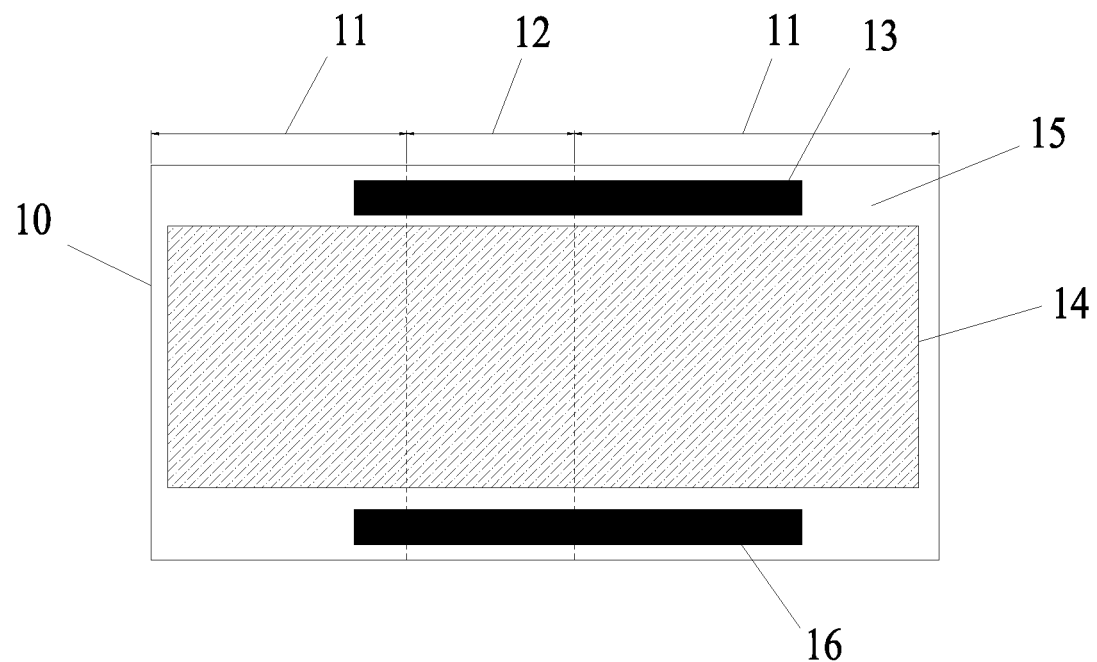
- FIG. 1 is a schematic diagram of structure of a flexible display cover plate according to the present disclosure.

| Reference signs in the drawings are explained below. | | |
|---|---|---|
| 10 - Flexible substrate | 11 - Non-bendable portion | 12 - Bendable portion |
| 13 - Resilient functional layer | 14 - Display area | 15 - Non-display area |
| 16 - Resilient metal layer | 17 - Resilient filling layer | 18 - Boding layer |
| 19 - Flexible Display Cover Plate | 20 - Display panel | 21 - Opening |
| 161- First resilient metal layer | 162 - Second resilient metal layer | |
| 171- First resilient filling layer | 172 - Second resilient filling layer | |

DETAILED DESCRIPTION

Embodiments of the present disclosure may be implemented in a number of different forms. A person of ordinary skills in the art will readily understand a fact that implementations and contents may be transformed into a variety of forms without departing from spirit and scope of the present disclosure. Therefore, the present disclosure should not be construed as being limited only to what is described in the following embodiments. The embodiments of the present disclosure and the features in the embodiments may be combined with each other arbitrarily if there is no conflict.

The present disclosure provides a flexible display cover plate, a preparation method thereof and a foldable display apparatus. The flexible display cover plate of the present disclosure includes a flexible substrate, wherein the flexible substrate includes a plurality of non-bendable portions and at least one bendable portion, the bendable portion is connected between adjacent non-bendable portions, a resilient functional layer for resilience of the bendable portion is arranged on the flexible substrate, and the resilient functional layer covers at least part of the bendable portion.

According to the flexible display cover plate of the present disclosure, by arranging the resilient functional layer in the flexible display cover plate and utilizing resilient stress of the resilient functional layer, problems of poor bending reliability and difficult to recover to flat shape of the flexible display cover plate are solved, and performance of a fold display module recovering to flat shape after being bent is improved.

Figure 2:
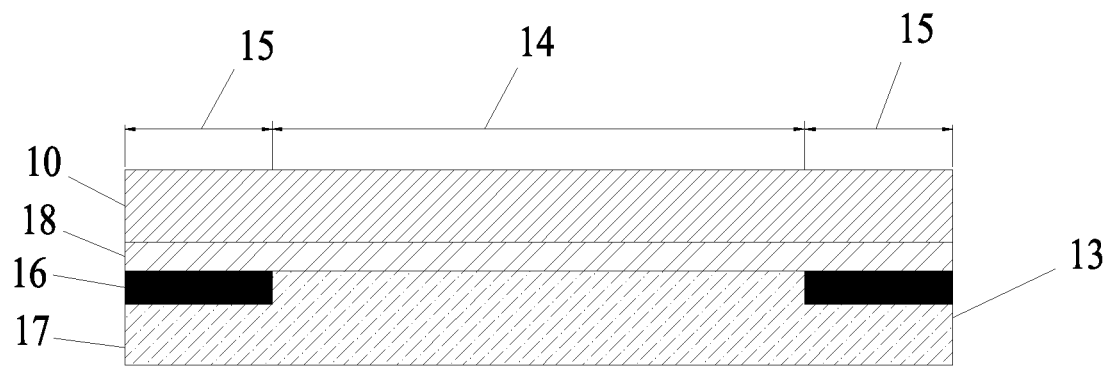
FIG. 2 is a cross-sectional view of a flexible display cover plate according to the present disclosure.

FIG. 1 is a schematic diagram of structure of a flexible display cover plate according to the present disclosure. FIG. 2 is a sectional view of a flexible display cover plate according to the present disclosure. As shown in FIGS. 1 and 2, the flexible display cover plate according to the present disclosure includes a flexible substrate 10, the flexible substrate 10 includes multiple non-bendable portions 11 and at least one bendable portion 12, the bendable portion 12 is connected between adjacent non-bendable portions 11, a resilient functional layer 13 for resilience of the bendable portion 12 is arranged on the flexible substrate 10, and the resilient functional layer 13 covers at least part of the bendable portion 12.

As shown in FIGS. 1 and 2, the flexible substrate 10 has a rectangular structure. The flexible substrate 10 includes a display area 14 and a non-display area 15, and the display area 14 is located in the middle of the flexible substrate 10, the non-display area 15 is located at edges of the flexible substrate 10 and surrounds a periphery of the display area 14. Both sides of the bendable portion 12 of the flexible substrate 10 are respectively connected with the non-bendable portions 11, and the bendable portion 12 extends across the flexible substrate 10 along a width direction of the flexible substrate 10, so that the flexible substrate 10 may be bent by bending the bendable portion 12.

As shown in FIGS. 1 and 2, the resilient functional layer 13 includes a resilient metal layer 16, the resilient metal layer 16 is located on the non-display area 15 of the flexible substrate 10. That is, the resilient metal layer 16 is located at edges of the flexible substrate 10. In the present disclosure, both sides of the flexible substrate 10 are provided with the resilient metal layers 16. The resilient metal layer 16 has a strip shape and penetrates through the bendable portion 12 of the flexible substrate 10 along a length direction of the flexible substrate 10. The resilient metal layer 16 may be made of an elastic metal material such as Cu, Al, etc., or an alloy material such as Ti—Ni alloy, Au—Cd alloy, Cu—Zn alloy, etc.

In the present disclosure, based on characteristics of the resilient metal layer 16 of high metal modulus, large resilience and not easy to occur creep, the resilient metal layer 16 is directly applied to the flexible substrate 10, to directly improve bending reliability and resilience of the whole flexible display cover plate. Further, in the present disclosure, based on a structural characteristic that a size of the flexible display cover plate is larger than that of the display panel, the resilient metal layer 16 is arranged on the non-display area 15 of the flexible display cover plate, so that a display effect of the display area 14 of the flexible display cover plate is not affected, and a good improvement effect may be achieved with respect to problems of poor bending reliability and difficult to recover to flat shape of the flexible display cover plate.

As shown in FIG. 2, the resilient functional layer 13 further includes a resilient filling layer 17. In the present disclosure, the resilient metal layer 16 is formed on the non-display area 15 of the flexible substrate 10, and the resilient filling layer 17 is formed on the resilient metal layer 16. The resilient filling layer 17 covers the entire flexible substrate 10, that is, the resilient fill layer 17 covers the display area 14 and the non-display area 15 of the flexible substrate 10. The resilient filling layer 17 may further enhance resilient capability of the flexible display cover plate, and may be matched with a supporting resilient structure on a back of the fold display module, so as to achieve a better effect with respect to a problem of resilient of the fold display module after being, as a whole, reliably bent. Meanwhile, the resilient filling layer 17 may be used to fill a height difference between the resilient metal layer 16 and the display area 14 of the flexible substrate 10. The material of the resilient filling layer 17 is a transparent material, such as transparent silicon gel or transparent optical bonding material.

As shown in FIG. 2, a bonding layer 18 is provided between the resilient functional layer 13 and the flexible substrate 10. The resilient functional layer 13 is bonded to the flexible substrate 10 through the bonding layer 18. The material of the bonding layer 18 may be Optically Clear Adhesive (OCA) or Optically Transparent Resin (OCR).

In the present disclosure, the material of the flexible substrate 10 is transparent polyimide or other transparent materials with high recovery capability, such as transparent silicon gel, etc. Elastic modulus of the flexible substrate 10 using the above-mentioned materials may reach 5-8 GPa which is higher than that of other materials, and has a stress and a creep at high temperature that are obvious and unrecoverable, thus the resilient functional layer 13 plays a key role in the recovery capability of the flexible display cover plate after being, as a whole, reliably bent.

Figure 3:
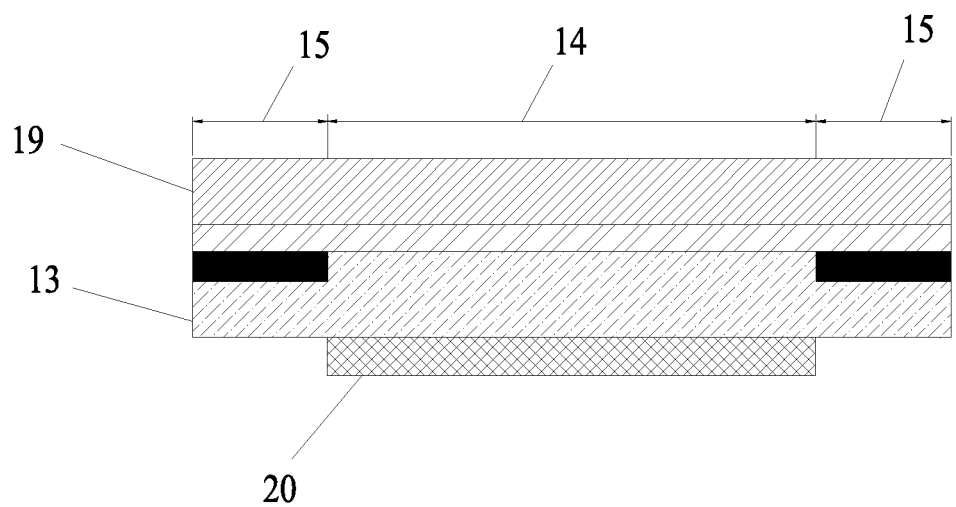
FIG. 3 is a cross-sectional view of a flexible display cover plate after being attached to a display panel according to the present disclosure.

FIG. 3 is a cross-sectional view of a flexible display cover plate being attached to a display panel. As shown in FIG. 3, the flexible display cover plate 19 of the present disclosure is adapted to be attached to a flexible display panel 20. Specifically, the flexible display panel 20 is attached to the resilient functional layer 13 of the flexible display cover 19 and corresponds to the display area 14 of the flexible display cover 19. Herein, a size of the flexible display panel 20 is the same as that of the display area 14 of the flexible display cover 19. Light emitted from the flexible display panel 20 passes through the resilient functional layer 13 and displays on the display area 14 of the flexible display cover 19.

According to the structure of the display substrate disclosed by the present disclosure, the resilient metal layer is arranged on the non-display area of the flexible display cover plate, the recovery capability of the flexible display cover plate after being bent may be improved by utilizing the resilient stress of the metal while the display effect of the display area of the flexible display cover plate is not affected, and the problem that the whole fold display module is difficult to recover after being reliably bent is further solved According to the present disclosure, the resilient functional layer is arranged on the flexible substrate, the resilient capability of the flexible display cover plate is enhanced, and meanwhile, the resilient filling layer may be used for filling the height difference between the resilient metal layer and the display area of the flexible substrate.

In a word, the present disclosure effectively solves the problem that the existing fold display module is difficult to flatten and recover after being bent, and improves performance of recovering to flat shape of the fold display module after being bent.

Figure 4:
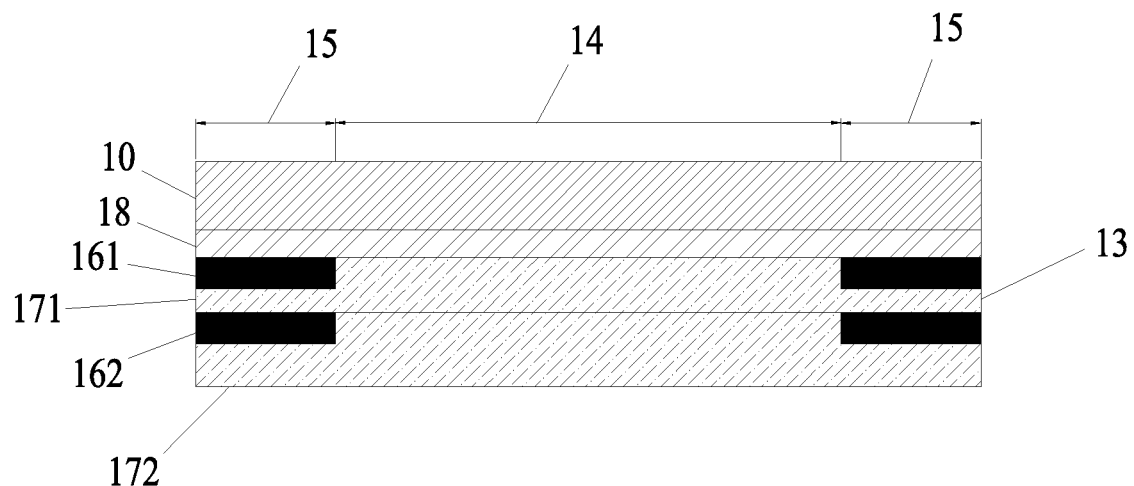
FIG. 4 is a cross-sectional view of a flexible display cover plate according to the present disclosure.

FIG. 4 is a cross-sectional view of a flexible display cover plate according to the present disclosure. As shown in FIG. 4, structure of the flexible display cover plate of the present disclosure is similar to the structure described in any one of the previous embodiments, except that the resilient functional layer 13 of the flexible display cover plate of the present disclosure includes a first resilient metal layer 161 and a second resilient metal layer 162 which are superposed one above another, and the first resilient metal layer 161 and the second resilient metal layer 162 are separated by a resilient filling layer 17. Specifically, the first resilient metal layer 161 is formed on the non-display area 15 of the flexible substrate 10, and the first resilient metal layers 161 are each located on both sides of the flexible substrate 10. The first resilient filling layer 171 is formed on the first resilient metal layer 161, and the first resilient filling layer 171 covers the entire flexible substrate 10. The second resilient metal layer 162 is formed on the first resilient filling layer 171. The second resilient metal layers 162 are each located on both sides of the flexible substrate 10 and correspond to the first resilient metal layer 161. The second resilient filling layer 172 is formed on the second resilient metal layer 162, and the second resilient filling layer 172 covers the entire flexible substrate 10.

In an exemplary embodiment, the resilient functional layer includes at least three resilient metal layers superposed one above another, and adjacent above and below resilient metal layers are separated by a resilient filling layer. For example, the resilient functional layer includes multiple resilient metal layers, such as three, four or five layers, which will not be repeatedly described in the present disclosure herein.

Figure 5:
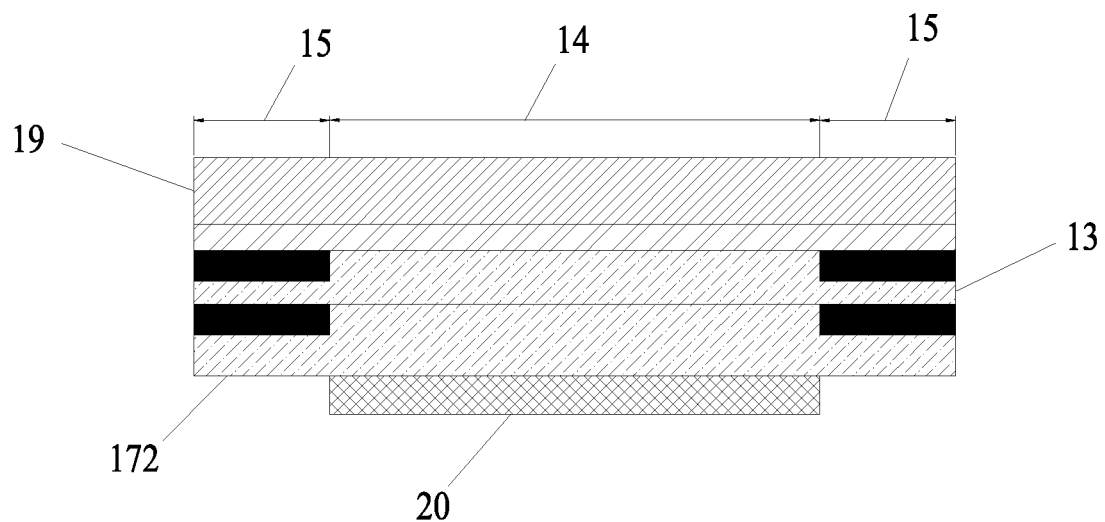
FIG. 5 is a cross-sectional view of a flexible display cover plate after being attached to a display panel according to the present disclosure.

FIG. 5 is a cross-sectional view of a flexible display cover plate being attached to a display panel according to the present disclosure. As shown in GIG. 5, a flexible display cover plate 19 of an embodiment of the present disclosure is adapted to be attached to a flexible display panel 20. Specifically, the display panel 20 is attached to a second resilient filling layer 172 of the flexible display cover 19 and corresponds to a display area 14 of the flexible display cover 19. A size of the display panel 20 is the same as that of the display area 14 of the flexible display cover 19. Light emitted from the display panel 20 passes through the resilient functional layer 13 and displays on the display area 14 of the flexible display cover 19.

According to the flexible display cover plate with the structure disclosed by the present disclosure, a problem that a conventional fold display module is difficult to recover to flat shape after being bent is effectively solved, and performance of recovering to flat shape of the fold display module after being bent is improved.

Figure 6:
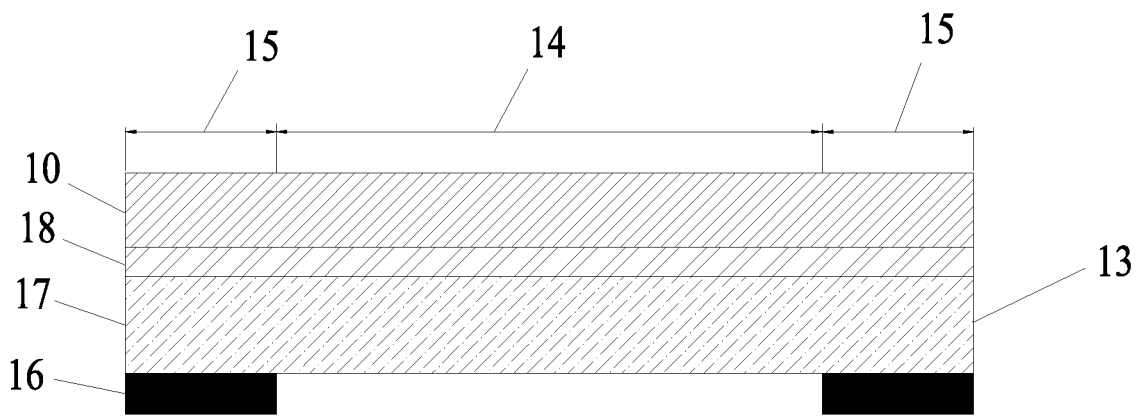
FIG. 6 is a cross-sectional view of a flexible display cover plate according to the present disclosure.

FIG. 6 is a cross-sectional view of a flexible display cover plate according to the present disclosure. As shown in FIG. 6, a structure of the flexible display cover plate of the present disclosure is similar to that described in any of the previous embodiments, except that a resilient filling layer 17 is directly formed over the flexible substrate 10 of the flexible display cover plate of the present disclosure, the resilient filling layer 17 covers the entire flexible substrate 10, a resilient metal layer 16 is formed on the resilient filling layer 17, and the resilient metal layer 16 corresponds to the non-display area 15 of the flexible substrate 10. In the present disclosure, the resilient metal layer 16 is superposed on an outside of the resilient filling layer 17, so that the resilient metal layer 16 may be used as a connecting portion with the whole of a fold equipment, and may be assembled and combined with the whole of the fold equipment by means of bonding or metal riveting.

Figure 7:
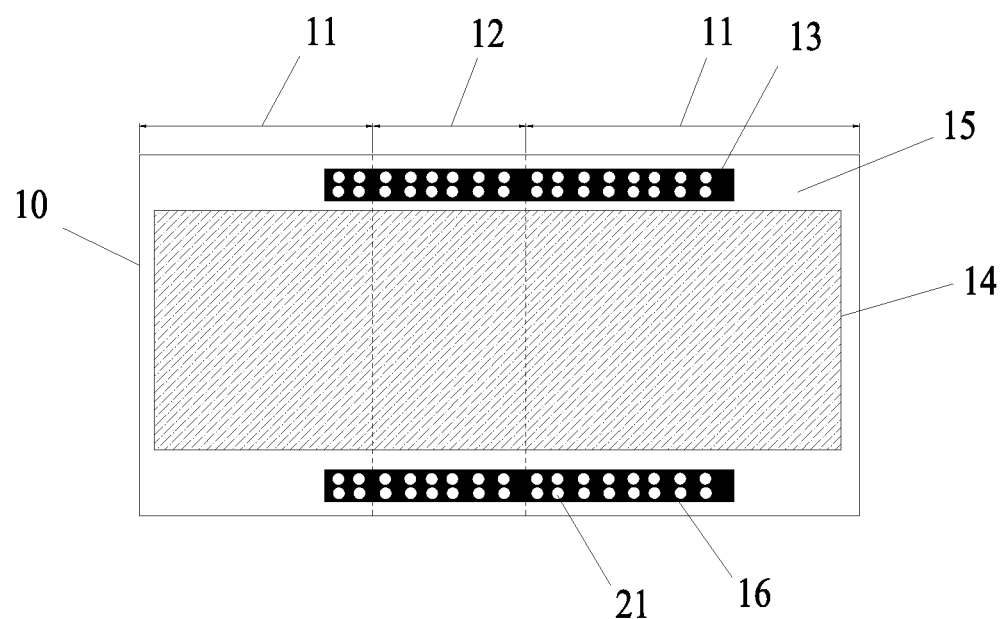
FIG. 7 is a schematic diagram of structure of a flexible display cover plate according to the present disclosure.

FIG. 7 is a schematic diagram of a structure of a flexible display cover plate. As shown in FIG. 7, a structure of the flexible display cover plate of the present disclosure is similar to the structure described in any of the previous embodiments, except that a resilient functional layer 13 includes a resilient metal layer 16 located on a non-display area 15 of the flexible substrate 10, and all or part of the resilient metal layer 16 is provided with openings 21. In the flexible display cover plate of the present disclosure, based on characteristics of the resilient metal layer 16 of high metal modulus, large resilience and not easy to occur creep, the resilient metal layer 16 is directly applied to the flexible substrate 10, to directly improve bending reliability and resilience of the whole flexible display cover plate. At the same time, through arranging the openings 21 on all or part of resilient metal layer 16 in the present disclosure, flexibility of the resilient metal layer 16 and reliability of resilience of the resilient metal layer 16 being bent are improved to ensure that the resilient metal layer 16 will not break.

The present disclosure further provides a preparation method of a flexible display cover plate to prepare the flexible display cover plate of the previous embodiments.

The preparation method of the flexible display cover plate according to the present disclosure includes: forming a flexible substrate with multiple non-bendable portions and at least one bendable portion, the bendable portion being connected between adjacent non-bendable portions; and forming a resilient functional layer for resilience of the bendable portion on the flexible substrate, the resilient functional layer covering at least part of the bendable portion.

The present disclosure further provides a foldable display apparatus including any one of the flexible display cover plates described above. The display apparatus may be any product or component with a display function such as a mobile phone, a tablet computer, a television, a display, a notebook computer, a digital photo frame, a navigator, etc.

In the description of the present disclosure, it should be understood that a direction or position relationship indicated by the terms "middle", "up", "down", "front", "rear", "vertical", "horizontal", "top", "bottom", "inner", "outer" and the like is based on the direction or position relationship shown in the drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

In the description of the present disclosure, it should be noted that, unless otherwise clearly specified or defined, the term "install", "connect" or "link" should be broadly interpreted, for example, it may be fixed connection, detachable connection, or integral connection. It may be a mechanical connection or an electrical connection, and it may be direct connection, indirect connection through an intermediary, or an internal connection between two elements. Those of ordinary skills in the art can understand the specific meanings of the above terms in the present disclosure according to specific situations.

Although implementations disclosed in the present disclosure are as the above, the contents are only implementations for facilitating understanding the present disclosure and are not used to limit the present disclosure. Any person skilled in the art to which the present disclosure pertains can make any modifications and variations in forms and details of implementation without departing from the spirit and scope of the present disclosure. However, the scope of patent protection of the present application shall still be determined by the scope as defined in the appended claims.

What we claim is:

1. A flexible display cover plate comprising a flexible substrate, wherein the flexible substrate comprises a plurality of non-bendable portions and at least one bendable portion, the bendable portion being connected between adjacent non-bendable portions, a resilient functional layer for resilience of the bendable portion being arranged on the flexible substrate, and the resilient functional layer covering at least a portion of the bendable portion.

2. The flexible display cover plate according to claim 1, wherein the resilient functional layer comprises at least one resilient metal layer, the bendable portion comprises a display area and a non-display area, and the resilient metal layer is located on the non-display area.

3. The flexible display cover plate according to claim 2, wherein the display area is located in middle of the flexible substrate, and the non-display area is located at edges of the flexible substrate and surrounds a periphery of the display area.

4. The flexible display cover plate according to claim 2, wherein all or part of the resilient metal layer is provided with openings.

5. The flexible display cover plate according to claim 2, wherein the resilient functional layer further comprises a resilient filling layer, the resilient metal layer is formed on the flexible substrate, and the resilient filling layer is superposed on the resilient metal layer and covers the flexible substrate.

6. The flexible display cover plate according to claim 5, wherein the resilient functional layer comprises a plurality of resilient metal layers arranged in superposition, and adjacent resilient metal layers are separated by the resilient filling layer.

7. The flexible display cover plate according to claim 2, wherein the resilient functional layer further comprises a resilient filling layer, the resilient filling layer is superposed on the flexible substrate and covers the flexible substrate, and the resilient metal layer is superposed on the resilient filling layer.

8. The flexible display cover plate according to claim 5, wherein a material of the resilient filling layer is a transparent material.

9. The flexible display cover plate according to claim 7, wherein a material of the resilient filling layer is a transparent material.

10. The flexible display cover plate according to claim 8, wherein a material of the resilient filling layer is transparent silicon gel or a transparent optical bonding material.

11. The flexible display cover plate according to claim 9, wherein a material of the resilient filling layer is transparent silicon gel or a transparent optical bonding material.

12. The flexible display cover plate according to claim 2, wherein the resilient metal layer is of a strip shape, and the resilient metal layer penetrates through the bendable portion of the flexible substrate along a length direction of the flexible substrate.

13. The flexible display cover plate according to claim 1, wherein a bonding layer is provided between the resilient functional layer and the flexible substrate.

14. The flexible display cover plate according to claim 13, wherein a material of the bonding layer is Optically Clear Adhesive or Optically Transparent Resin.

15. The flexible display cover plate according to claim 1, wherein a material of the flexible substrate is transparent polyimide or transparent silicon gel.

16. The flexible display cover plate according to claim 1, wherein the bendable portion extends across the flexible substrate along a width direction of the flexible substrate.

17. The flexible display cover plate according to claim 1, wherein the flexible display cover plate is adapted to be attached to a display panel.

18. The flexible display cover plate according to claim 17, wherein the display panel corresponds to a display area of the flexible display cover plate, and a size of the display panel is the same as that of the display area of the flexible display cover plate.

19. A foldable display apparatus comprising the flexible display cover plate according to claim 1.

20. A method for preparing a flexible display cover plate, comprising:
- forming a flexible substrate with a plurality of non-bendable portions and at least one bendable portion, the bendable portion being connected between adjacent non-bendable portions; and
- forming a resilient functional layer for resilience of the bendable portion on the flexible substrate, the resilient functional layer covering at least part of the bendable portion.

\* \* \* \* \*